United States Patent [19]

Teske

[11] 4,249,845
[45] Feb. 10, 1981

[54] SYSTEM FOR RECLAIMING BULK SOLIDS FROM A STORAGE PILE

[76] Inventor: Lothar Teske, Hegelstrasse 15, 5000 Köln, Fed. Rep. of Germany

[21] Appl. No.: 964,922

[22] Filed: Nov. 30, 1978

[51] Int. Cl.$^3$ .............................................. B65G 63/00
[52] U.S. Cl. ................................... 414/133; 198/518; 414/306
[58] Field of Search ............... 414/133, 144, 145, 304, 414/305, 306; 198/506, 508, 517, 518, 520, 522

[56] References Cited

U.S. PATENT DOCUMENTS

| 1,778,533 | 10/1930 | Meyer | 414/145 |
| 3,642,153 | 2/1972 | Adler et al. | 414/145 X |

FOREIGN PATENT DOCUMENTS

| 312814 | 6/1919 | Fed. Rep. of Germany | 414/133 |
| 1547567 | 10/1968 | France | 414/133 |
| 999958 | 7/1965 | United Kingdom | 414/133 |

Primary Examiner—Frank E. Werner
Attorney, Agent, or Firm—Karl F. Ross

[57] ABSTRACT

Bulk solids are reclaimed from a large bulk-solids storage pile standing on the ground by a system having a row of arches extending underneath the pile and having feet standing on the ground. An elongated downwardly concave roof is supported on this row of arches and has horizontally spaced lower edges spaced above the ground. A pair of longitudinally extending and parallel tables are supported on the arches below the lower edges of the roof and each have an outer edge turned away from the other table and an inner edge defining with the inner edge of the other table a horizontally extending slot so that bulk solids can flow under the lower edges onto the tables. A carriage is displaceable longitudinally along the row of arches above the slot and under the roof and carries an impeller which is displaceable across the tables and across the slot so that it can sweep material on the tables into the slot. A longitudinally extending conveyor underneath and parallel to the slot is operated to carry away bulk solids swept by the impeller into the slot and falling onto the conveyor. Sidewalls mounted on the outsides of the arches flank this conveyor and are joined at their upper edges to the tables to form a service passage underneath the row of arches.

7 Claims, 2 Drawing Figures

U.S. Patent  Feb. 10, 1981  4,249,845
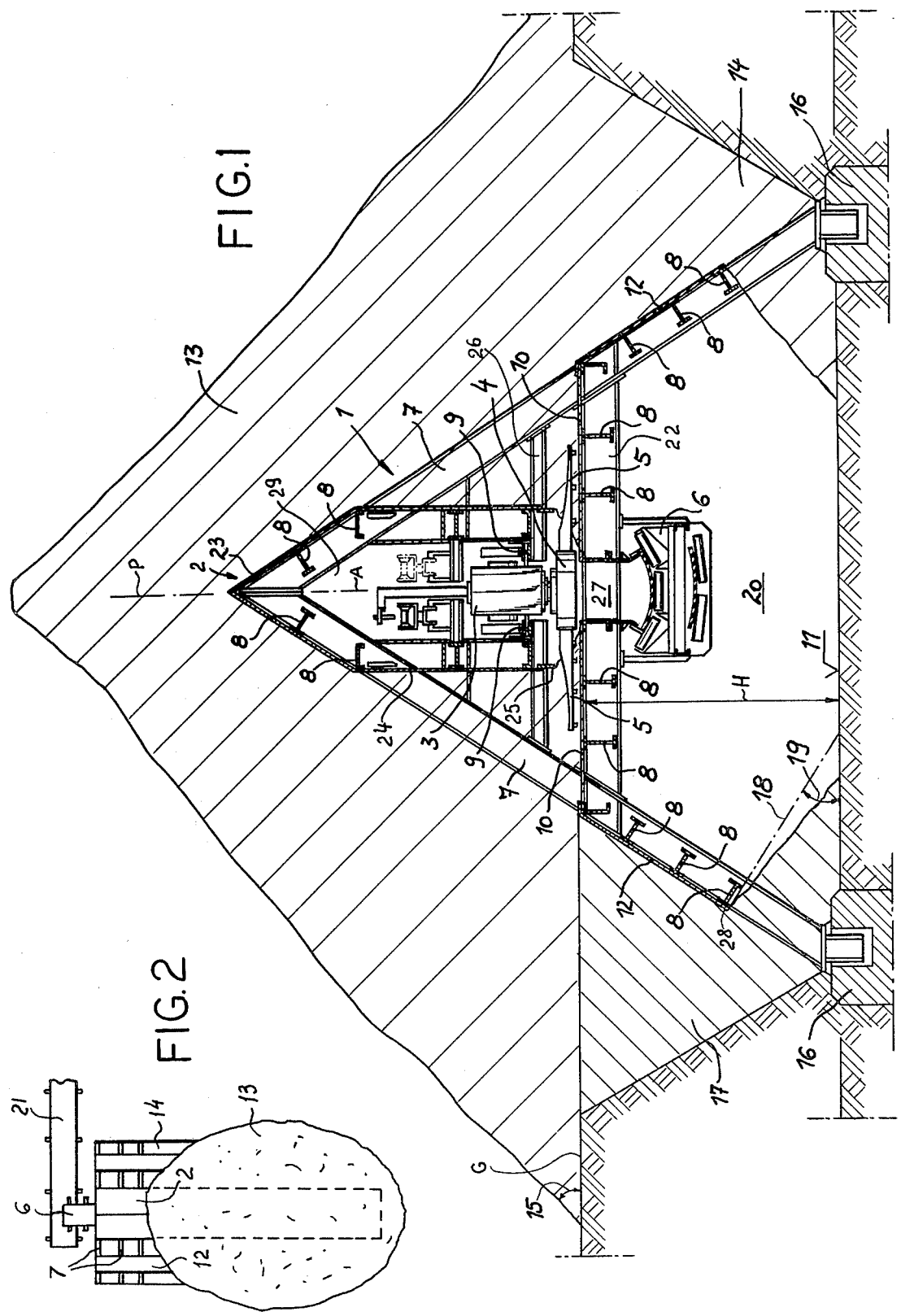

SYSTEM FOR RECLAIMING BULK SOLIDS FROM A STORAGE PILE

FIELD OF THE INVENTION

The present invention relates to a system for reclaiming bulk solids from a large bulk-solids storage pile. More particularly, this invention concerns such a system for reclaiming solids from a pile standing in the open on the ground.

BACKGROUND OF THE INVENTION

Open-yard storage of solids in bulk is used for coal, various ores, and similar bulk solids not susceptible to degradation by normal weather condition. As in any type of storage system it is essential to rotate the stored material, that is the first material stored should be the first material reclaimed. This necessitates, of course, reclaiming the material from the bottom of the pile, which in some systems can be several hundred meters long and 10 to 20 meters high.

Accordingly it is a standard practice to form in the ground underneath the normally elongated storage pile an underground tunnel made of reinforced concrete. A heavy-duty conveyor belt is provided in this tunnel. Floor gates, such as described in my earlier patent application Ser. No. 872,832 filed Jan. 27, 1978 allow the material to drop through the floor of the pile, which is also the roof of the tunnel, onto the conveyor belt. It is also known to provide such floor openings with unloading carriages such as described in my copending application Ser. No. 855,270 filed Nov. 28, 1977 (now abandoned).

The disadvantage of such a system is that the construction of the underground tunnel is an extremely expensive operation. Furthermore, in the event that the storage system is no longer needed it is impossible to reclaim the elements of the reclaiming apparatus.

OBJECTS OF THE INVENTION

It is therefore an object of the present invention to provide an improved system for reclaiming bulk solids from a large bulk storage pile standing on the ground.

Another object is the provision of such a system which is substantially less expensive to construct than the prior-art system.

A further object of this invention is to provide a bulk-solid reclaiming system which can be dismantled and reused if necessary.

SUMMARY OF THE INVENTION

These objects are attained according to the instant invention in a system having a row of arches extending underneath the pile and having feet standing on the ground. An elongated downwardly concave roof is supported on this row of arches and has horizontally spaced lower edges spaced above the ground. A pair of longitudinally extending parallel tables are supported on these arches below the lower edges of the roof and each has an outer edge turned away from the other table and an inner edge defining with the inner edge of the other table a horizontally extending and vertically open slot. Thus bulk solids can flow under the lower edges of the roof onto the table. A carriage displaceable longitudinally along the row of arches above the slot and under the roof has an impeller which is displaceable across the tables and across the slot and which can be driven to sweep material on the tables into the slot. A longitudinally extending conveyor underneath and generally parallel to the slot above the feet of the arches can be operated to longitudinally carry away bulk solids swept by the impeller into the slot and falling onto the conveyor. Sidewalls flank this conveyor and are supported on the arches, these sidewalls each having an upper edge joined to the respective table and a lower edge.

Thus the system according to the inttant invention completely eliminates the necessity for an expensive underground tunnel. Instead the conveyor itself is provided in a passage, normally at least 1.5 meters high so that service personnel can move through it if necessary, and a simple roof arrangement fitted to the row of arches allows the bulk solids to flow horizontally in on the tables so that they can be pushed into the slot and fall onto the conveyor. The system furthermore can, if necessary, be completely dismantled, as at most all that need be permanently build are some footings for the feet of the arches.

The arches according to this invention are A-frames, although it is fully within the scope of this invention to use other shapes. When A-frames are employed the cross members are used to support the table and a guide or rail for the carriage. The conveyor may also be hung from the cross members of the A-frames, or supported directly on the ground below the slot formed between the tables. The sidewalls and main parts of the roof are secured to the outside of the A-frames, so that these elements need not be extremely rigidly fastened as the weight of the bulk solids on top of them will hold them securely.

According to another feature of this invention, the lower edges of the sidewalls are spaced above the ground between the feet by such a distance that a perpendicular to each wall at the respective lower edge thereof intersects the ground between the feet at a location no further than midway between the feet and at an angle at most equal to the angle of repose of the bulk solids. Thus a clear space will be left on the ground underneath the conveyor.

The row of arches according to this invention is made of sufficient length that it can project at least at one end from underneath of the pile of bulk solids. The reclaimed goods will be recovered and transported away at this projecting end.

The row of arches according to this invention may be erected in a trench so that the tables lie at a level substantially equal to the level of the ground to either side of this trench. This type of construction allows the pile to be exploited fully, and in no way decreases the capacity of the pile, which capacity is largely determined by the angle of repose of the bulk solids forming the pile. The trenching and then burying of the lower portions of the arches still does not increase the construction cost to the relatively high level of those systems employing an underground tunnel.

BRIEF DESCRIPTION OF THE DRAWING

FIG. 1 is a vertical cross section through a system according to this invention; and FIG. 2 is a small-scale top view of the system of this invention.

SPECIFIC DESCRIPTION

As shown in FIG. 1 a system for reclaiming bulk solids from a large bulk-solids storage pile 13 has a row of like A-frame arches 1 each having a pair of legs 7 extending at an angle of substantially 60° to each other and a horizontal cross member of span 22. These arches 1, which can also be made of standard round-top arch shape if desired, are arranged in a row and are interconnected longitudinally within the row both at the legs 7 and at the cross member 22 by means of longitudinally extending beams 8. The lower ends of the legs 7 sit in footings 16 at the base 11 of a trench 14 lying below the ground level G.

Carried on this row of arches 1 is a roof structure 2 comprising plates 23 secured externally to the legs 7 and beams 8 at the apexes of the arches 1, and vertical plates 24 having lower edges 25 spaced above the ground level G.

A carriage 3 can be displaced longitudinally within the row of arches 1 on rails 9 carried on cross members 26 above the main cross members 22. This carriage 3 is provided with an impeller wheel 4 having horizontally and radially extending arms 5 that can be displaced angularly about a vertical axis A of the carriage 3. This unloading carriage is virtually identical to that described in my above-cited copending application Ser. No. 855,270. The arms 5 extend horizontally outwardly below the lower edges 25 of the side part 24 of the roof 2.

Carried on the main cross members 22 are a pair of horizontally spaced plates 10 at the ground level G and each having an outer edge at the extreme outer edge of the arches 1 and an inner edge spaced somewhat outwardly of the symmetry plane P of the system so as to form a downwardly open gap or slot 27.

Hung from the cross members 22 below the slot 27 is a belt-type conveyor 6 which extends as shown in FIG. 2 longitudinally beyond the roof 2 at the exposed end of this system above a transverse upward conveyor 21.

Secured to the outer side of the arches 1 are side plates or walls 12 having lower edges 28 spaced above the floor 11 of the trench 14 by such a distance that a perpendicular 18 drawn from the sidewall 12 at the edge 28 will form an angle 19 with the floor 11 that is no greater than the angle 15 of repose of the material forming the pile 13. Thus the side plates 12, which meet at their upper edges with the tables 10, will form an open passage 20 having a height H below the plates 10 of approximately 2 meters. This passage 20 is therefore largely adequate for a service person to move in when the conveyor 6 needs servicing. In the event that the carriage 3 or its associated parts needs servicing it can be drawn longitudinally out of the passage 29 formed between the sidewalls 24 for access to the interior. The carriage 3 is normally pulled back and forth by means of a cable.

The arrangement described above is simply constructed by digging the trench 14, and emplacing the footings 16. The arches 1 are then stood on the footings 16 and interconnected by means of the longitudinal beams 8. Thereafter the various sideplates 23 and 28 are mounted, along with the other structural parts. The entire arrangement may be then covered with the pile 13, or fill 17 can be employed as shown to the left in FIG. 1.

In use the conveyor 6 operates continuously and the carriage 3 is slowly reciprocated longitudinally the full length of the pile 13 so as to undermine it and displace the material that flows underneath the edges 25 onto the tables 10 into the slot 27, so that the conveyor 6 can carry this material out.

I claim:

1. A system for reclaiming bulk solids from a large bulk-solids storage pile standing on the ground, said system comprising:
    a row of A-frame arches extending underneath said pile and each having a pair of legs having feet standing on the ground and a horizontal cross member spanning the respective legs;
    a guide supported on said arches and extending longitudinally along said row of arches;
    an elongated downwardly concave roof supported on said row of arches and having horizontally spaced lower edges spaced above the ground;
    a pair of longitudinally extending generally parallel tables supported on said cross members of said arches below said lower edges of said roof and below said guide and each having an outer edge turned away from the other table and an inner edge defining with the inner edge of the other table a horizontally extending slot, whereby said bulk solids can flow under said lower edges onto said tables;
    a carriage displaceable longitudinally along said guides above said slot and under said roof;
    an impeller on said carriage displaceable across said tables and along said slot and having arms extending horizontally outwardly beyond said roof below said lower edges thereof;
    means for driving said impeller and sweeping material on said tables into said slot with said arms;
    a longitudinally extending conveyor hung from said cross members underneath and generally parallel to said slot above said feet;
    means for operating said conveyor and thereby longitudinally carrying away bulk solids swept by said arms of said impeller into said slot and falling onto said conveyor; and
    respective sidewalls flanking said conveyor and supported on said arches, said sidewalls each having an upper edge joined to the respective table and a lower edge spaced above the ground.

2. The system defined in claim 1 wherein said row of arches and said roof extend horizontally from underneath said pile.

3. The system defined in claim 1 wherein said lower edges of said sidewalls are below said conveyor.

4. The system defined in claim 3 wherein said tables are at least 1.5 meters above the grounds supporting said feet.

5. The system defined in claim 3 wherein said sidewalls are plates secured from outside against said legs of said arches.

6. The system defined in claim 3 wherein the ground is formed underneath said pile with a trench having a floor constituting the ground level in said trench, said feet standing on said floor and said tables being level with the ground to either side of said trench.

7. The system defined in claim 3 wherein said lower edges of said sidewalls are spaced above the ground between said feet by such a distance that a perpendicular to each wall at the respective lower edge intersects the ground between said feet at a location no more than midway between said feet and at an angle at most equal to the angle of repose of said bulk solids.

* * * * *